United States Patent
Huggins

[19]

[11] Patent Number: 5,908,123
[45] Date of Patent: Jun. 1, 1999

[54] RAIL CAR BUFFER AND METHOD

[75] Inventor: Russell J. Huggins, Wellsville, Pa.

[73] Assignee: Keystone Industries, Inc., Camp Hill, Pa.

[21] Appl. No.: 08/785,092

[22] Filed: Jan. 21, 1997

[51] Int. Cl.⁶ .................................................. B61G 11/12
[52] U.S. Cl. .......................... 213/223; 188/287; 267/219
[58] Field of Search .............................. 213/223, 43, 45; 188/269, 282.7, 282.8, 287, 315, 317, 322.13, 322.15; 267/219

[56] References Cited

U.S. PATENT DOCUMENTS

| | | | |
|---|---|---|---|
| 1,457,122 | 5/1923 | Ree | 188/282.7 |
| 1,548,773 | 8/1925 | Ziebarth . | |
| 1,772,414 | 8/1930 | Brooke-Hunt et al. . | |
| 2,486,741 | 11/1949 | Gabriel . | |
| 2,553,635 | 5/1951 | Dath . | |
| 2,713,483 | 7/1955 | Tillou | 267/1 |
| 2,719,612 | 10/1955 | Bourcier de Carbon De Previnquieres | 188/88 |
| 2,985,319 | 5/1961 | Simmons | 213/45 |
| 3,040,907 | 6/1962 | Pelabon | 213/43 |
| 3,110,367 | 11/1963 | Roberts | 188/96 |
| 3,176,972 | 4/1965 | Deschner | 267/1 |
| 3,207,324 | 9/1965 | Blake | 213/8 |
| 3,301,410 | 1/1967 | Seay | 213/43 |
| 3,307,842 | 3/1967 | Ellis, Jr. | 267/1 |
| 3,515,382 | 6/1970 | Gallagher | 267/1 |
| 3,554,387 | 1/1971 | Thornhill et al. | 213/223 |
| 3,596,774 | 8/1971 | MacCurdy | 213/8 |
| 3,605,960 | 9/1971 | Singer | 188/287 |
| 3,693,767 | 9/1972 | Johnson | 188/285 |
| 3,729,101 | 4/1973 | Brambilla et al. | 213/45 |
| 3,782,710 | 1/1974 | Selke et al. | 267/118 |
| 3,795,390 | 3/1974 | Kendall et al. | 267/33 |
| 3,819,219 | 6/1974 | Pamer | 293/88 |
| 3,826,481 | 7/1974 | Oeser | 267/152 |

(List continued on next page.)

FOREIGN PATENT DOCUMENTS

| | | |
|---|---|---|
| 888878 | 12/1959 | Brazil . |
| 1189419 | 8/1967 | Brazil . |
| 0 021 698 | 1/1981 | European Pat. Off. . |
| 0 373 152 | 5/1986 | European Pat. Off. . |
| 225167 | 11/1986 | European Pat. Off. . |
| 0 260 968 | 9/1987 | European Pat. Off. . |
| 0 268 061 | 10/1987 | European Pat. Off. . |
| 453701 | 1/1991 | European Pat. Off. . |
| 0 451 630 A1 | 3/1991 | European Pat. Off. . |
| 0 518 126 A1 | 5/1992 | European Pat. Off. . |
| 0 595 160 | 10/1992 | European Pat. Off. . |
| 0 578 187 A1 | 7/1993 | European Pat. Off. . |
| 885386 | 9/1943 | France . |
| 2119735 | 8/1972 | France . |
| 2169485 | 8/1973 | France . |
| 2630466 | 4/1988 | France . |
| 1234184 | 10/1996 | France .  ...... 8/1996 ..... Germany . |

(List continued on next page.)

OTHER PUBLICATIONS

"TecsPak Hydraulic Buffer for Reducing the Acceleration of Car Impacting" David G. Anderson, Proceedings of the ASME/IEEE Spring Joint Railroad Conference, Mar. 31–Apr. 2, 1992, pp. 69–74.

"Buffer gear for coaches", International Union of Railways, UIC Code 528 OR, 7$^{th}$ edition, Jan. 1, 1991, pp. 1–19.

"Wagons Buffers with a stroke of 105 mm", International Union of Railways, UIC Code 526–1 OR, 1$^{st}$ edition, Jan. 1, 1981 (Reprint, Jan. 11, 1991), pp. 1–31.

ETH Hydraulik–KombistoBdämpfer Kategorie C nach UIC 526–1 ETH 06.2100 (4 page pamphlet in German).

Primary Examiner—S. Joseph Morano
Attorney, Agent, or Firm—Thomas Hooker, P.C.

[57] ABSTRACT

A rail car buffer has a capsule body and a spring assembly with an elastomer spring and a gas filled hydraulic spring in the body. Expansion of the buffer after collapse is snubbed by the gas filled hydraulic spring to convert energy stored in the elastomer spring to heat.

50 Claims, 4 Drawing Sheets

U.S. PATENT DOCUMENTS

| | | | |
|---|---|---|---|
| 3,840,097 | 10/1974 | Holley | 188/287 |
| 3,889,934 | 6/1975 | Kamman | 267/34 |
| 3,891,199 | 6/1975 | Willich et al. | 267/139 |
| 3,997,037 | 12/1976 | Schupner | 188/315 |
| 3,998,302 | 12/1976 | Schupner | 188/285 |
| 4,002,244 | 1/1977 | Matsumoto et al. | 213/43 |
| 4,026,418 | 5/1977 | Hawthorne | 213/8 |
| 4,026,533 | 5/1977 | Hennells | 267/124 |
| 4,040,523 | 8/1977 | Carle et al. | 213/46 |
| 4,043,545 | 8/1977 | Dial et al. | 267/116 |
| 4,057,129 | 11/1977 | Hennells | 188/285 |
| 4,059,175 | 11/1977 | Dressell, Jr. et al. | 188/285 |
| 4,076,225 | 2/1978 | Houghton | 267/34 |
| 4,078,638 | 3/1978 | Koyama et al. | 188/288 |
| 4,198,037 | 4/1980 | Anderson | 267/153 |
| 4,482,035 | 11/1984 | Heideman et al. | 188/287 |
| 4,502,673 | 3/1985 | Clark | 188/287 |
| 4,660,687 | 4/1987 | Williams et al. | 188/287 |
| 4,709,791 | 12/1987 | Houghton | 188/315 |
| 4,742,898 | 5/1988 | Lee | 188/287 |
| 4,805,517 | 2/1989 | Conley et al. | 92/8 |
| 5,025,938 | 6/1991 | Bomgardner et al. | 213/43 |
| 5,064,033 | 11/1991 | Koike et al. | 188/306 |
| 5,076,451 | 12/1991 | Conley et al. | 213/43 |
| 5,104,101 | 4/1992 | Anderson et al. | 267/219 |
| 5,160,123 | 11/1992 | Danieli | 267/226 |
| 5,178,240 | 1/1993 | Houghton | 188/315 |
| 5,388,711 | 2/1995 | Hodges | 213/8 |
| 5,415,303 | 5/1995 | Hodges et al. | 213/43 |
| 5,465,944 | 11/1995 | Page et al. | 267/217 |
| 5,487,480 | 1/1996 | Page et al. | 213/43 |

FOREIGN PATENT DOCUMENTS

| | | |
|---|---|---|
| 196 19 214 | of 0000 | Germany . |
| 528242 | 6/1931 | Germany . |
| 528569 | 7/1931 | Germany . |
| 555012 | 7/1932 | Germany . |
| 1530167 | 11/1965 | Germany . |
| 3738716 A1 | 9/1988 | Germany . |
| 3921398 | 6/1989 | Germany . |
| 296 06 256 U | | |
| 298759 | of 0000 | Poland . |
| 300098 | of 0000 | Poland . |
| 305459 | of 0000 | Poland . |
| 305460 | of 0000 | Poland . |
| 162266 | 9/1990 | Poland . |
| 167543 | 12/1992 | Poland . |
| 170036 | 4/1993 | Poland . |
| 170451 | 5/1993 | Poland . |
| 816089 | 7/1959 | United Kingdom . |
| 881194 | 11/1961 | United Kingdom . |
| 2027517 | 2/1980 | United Kingdom . |
| 2059005 | 4/1981 | United Kingdom . |
| 2261489 | 11/1991 | United Kingdom . |
| 189102 | 10/1992 | United Kingdom . |
| 2281114 | 2/1995 | United Kingdom . |
| 2312659 | 11/1997 | United Kingdom . |
| 89/02385 | 3/1989 | WIPO . |
| 90/15267 | 12/1990 | WIPO . |
| 93/12360 | 6/1993 | WIPO . |
| 95/00382 | 6/1993 | WIPO . |
| 93/15332 | 8/1993 | WIPO . |
| 95/00382 | 1/1995 | WIPO . |
| 95/20333 | 8/1995 | WIPO . |

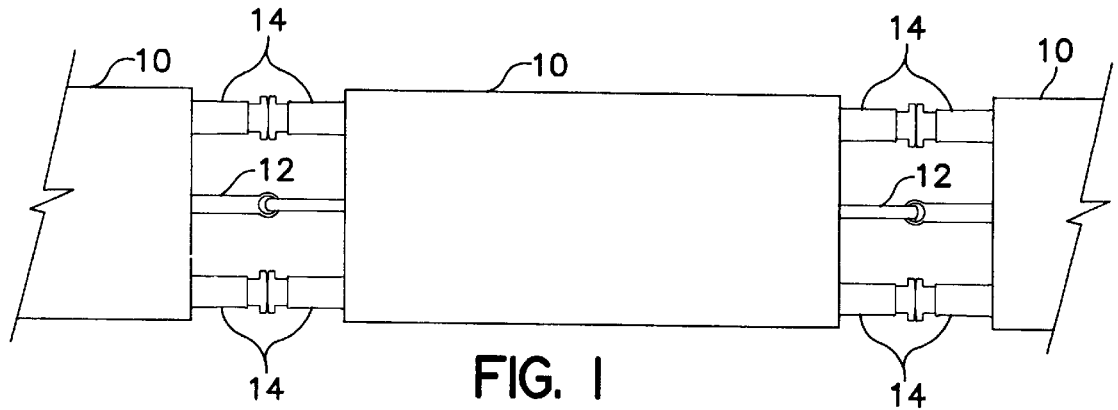
FIG. 1
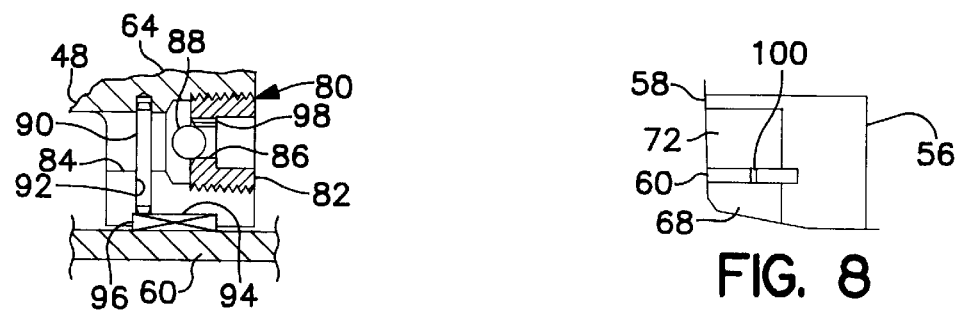
FIG. 7
FIG. 8
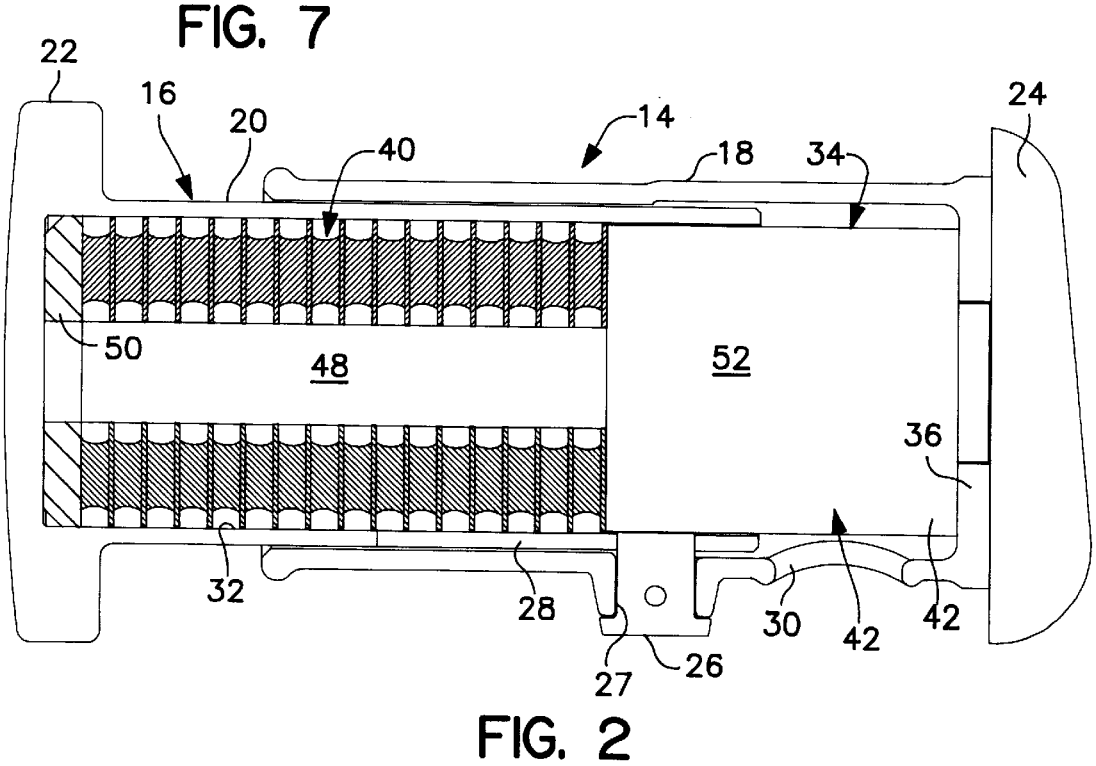
FIG. 2

RAIL CAR BUFFER AND METHOD

FIELD OF THE INVENTION

The invention relates to rail car cushioning devices, particularly rail car buffers, and related methods.

DESCRIPTION OF THE PRIOR ART

Rail car corner buffers conventionally include a collapsible capsule body surrounding a spring which resists collapse of the buffer. Buffers are commonly mounted in pairs on the ends of rail cars for contact with buffers mounted on adjacent rail cars to protect the rail cars and lading from excessive forces during impact, coupling, and normal train action events.

Buffers used in rail cars in European countries are required to meet standards established by the Union Internationale Chemins de Fer (International Union of Railways, (UIC)). The standards permit interchange of rail service between member countries. The UIC standards specify the physical dimensions of the buffer, the stroke of the buffer, the force-travel envelope for the buffer, the energy consumption requirements for the buffer and other characteristics of the buffer.

UIC performance requirements for high energy absorption buffers have become ever more stringent. However, the physical size of the buffers has not changed. Conventional high performance buffers meet present UIC high energy absorption standards when new, but in time lose resiliency. Additionally, the useful stroke of these buffers is limited.

SUMMARY OF THE INVENTION

The invention is a high performance rail car buffer capable of absorbing high energy impacts and meeting UIC requirements during a large useful life. The buffer includes a spring assembly having a cylindrical elastomer spring and a cylindrical gas filled hydraulic spring arranged in parallel so that both the springs collapse together. Both springs have the same diameter. The spring assembly is fitted in a standard buffer capsule.

The elastomer spring includes a number of stacked annular elastomer pads surrounding the piston rod of the hydraulic spring. During both static and dynamic collapse the compression force of the elastomer spring increases slowly upon initial collapse and increases very rapidly to a high level at the end of the collapse stroke. During expansion, the elastomer spring has a reaction force nearly equal to the compression force of the spring.

The gas filled hydraulic spring includes a piston on the end of a piston rod. The piston moves in a cylinder to flow pressurized hydraulic fluid through openings between chambers located to either side of the piston and outside the cylinder. The hydraulic spring has a low compression force during slow speed static collapse. The slowly moving piston moves hydraulic fluid freely between the chambers in the spring. When the spring is expanded, hydraulic fluid flows through a bleed orifice at a very slow rate into a chamber in front of the piston to create a pressure differential across the piston and snub expansion of the hydraulic spring against the reaction force of the elastomer spring. Snubbing slows expansion of the buffer and converts energy stored in the elastomer spring into heat thereby improving the efficiency of the buffer.

During dynamic collapse of the buffer, hydraulic fluid in the hydraulic spring is rapidly flowed through passages with a resultant rapid increase in the compression force of the hydraulic spring and conversion of impact energy into heat. The compression force of the hydraulic spring decreases as energy is absorbed and the collapse rate of the buffer slows. After initial collapse, the compression force of the elastomer spring increases rapidly.

The compression force of the buffer is the sum of the compression forces of both springs. The compression force for the hydraulic spring is greatest during initial, high speed collapse of the buffer after impact and the compression force for the elastomer spring is greatest during final relatively slow speed collapse of the buffer at the end of the collapse stroke. The sum of the two compression forces assures that the buffer has a high compression force during practically the entire dynamic collapse stroke and absorbs energy efficiently. During dynamic collapse, most of the energy received by the elastomer spring is stored elastically in the pads and is recovered during expansion of the buffer. Expansion is snubbed, thereby converting energy stored in the elastomer spring to heat and slowing expansion.

Snubbing continues during both static and dynamic expansion until the piston passes an aperture in the cylinder wall of the hydraulic spring to increase the flow of hydraulic fluid into the forward chamber and reduce the pressure differential across the piston. Before the aperture is opened during static expansion the snubbing force resisting expansion of the buffer is at a maximum and is nearly as great as the reaction force of the elastomer spring and the reaction force of the buffer is reduced to nearly zero. Upon opening of the aperture and increase of flow of hydraulic fluid into the chamber, the pressure differential is decreased and the reaction force of the buffer is increased from the minimum to a peak, following which the spring reaction and hydraulic forces gradually decrease until the buffer is fully extended.

UIC standards require that fully expanded buffers have a minimum preload compression force. In the invention, the minimum required preload is assured by gas pressure in the hydraulic spring. The elastomer spring provides a light additional preload. The gas pressure preload maintains the required preload during the long useful life of the buffer despite possible weakening of the elastomer spring preload.

Other objects and features of the invention will become apparent as the description proceeds, especially when taken in conjunction with the accompanying drawings illustrating the invention, of which there are four sheets.

DESCRIPTION OF THE DRAWINGS

FIG. 1 is a top view of a number of rail cars with draw gear connecting the cars and corner buffers;

FIG. 2 is a vertical sectional view taken through a corner buffer on a rail car;

FIG. 7 is an enlarged view of a check valve shown in FIG. 5;

FIG. 8 is an enlarged sectional view of an upper corner of a spring assembly illustrating an alternative bleed passage.

DESCRIPTION OF THE PREFERRED EMBODIMENT

Figure 3:
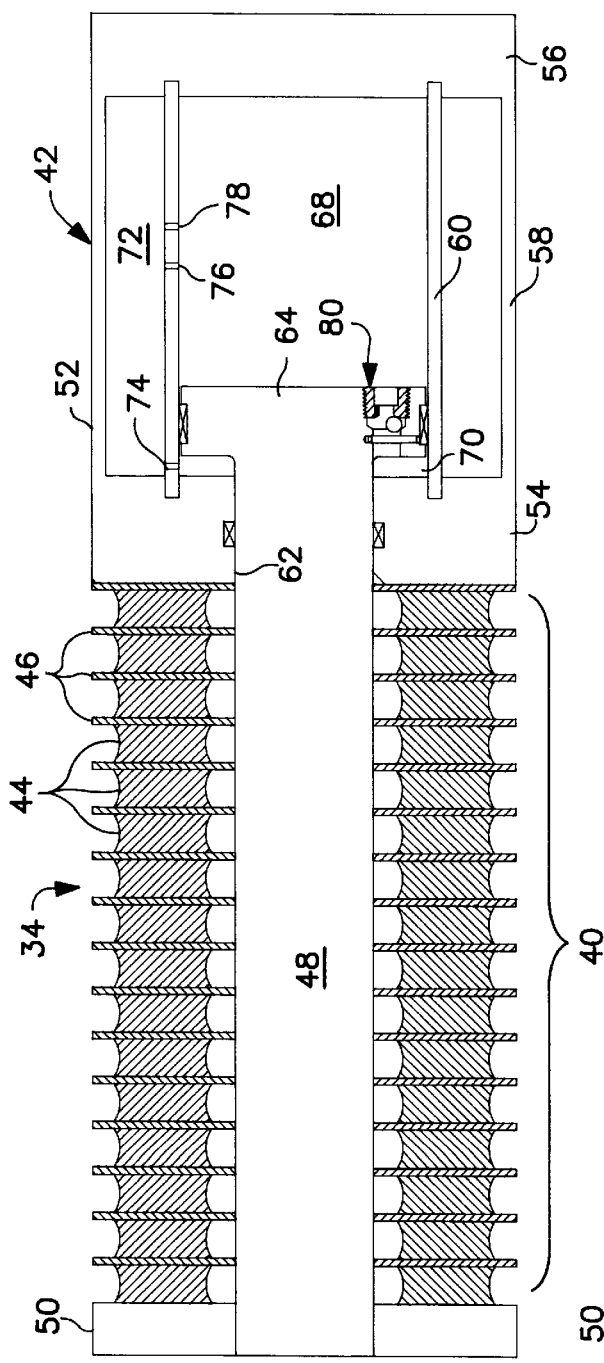
FIGS. 3–6 are sectional views taken through the spring assembly of the corner buffer during collapse and expansion to the extended position.

FIG. 1 illustrates a number of rail cars 10 joined together by draw gear 12 to form a train. Corner buffers 14 are mounted on the outer sides of the ends of rail cars 10 so that the contact head on each buffer engages a corresponding contact head on a buffer on the adjacent rail car. The buffer assemblies absorb and dissipate energy caused by impacts between rail cars during makeup of a train and train action events, including acceleration and deceleration of the train and movement of the train around curves.

As illustrated in FIG. 2 corner buffer 14 includes a capsule body 16 with a tubular base 18 and tubular plunger 20 fitted inside base 18. The plunger includes an outwardly facing contact head 22 which engages the corresponding head of the buffer on an adjacent rail car. Base 18 is mounted on and extends outwardly from rail car end 24. The base and plunger are held together by a plug 26 mounted in opening 27 at the bottom of the base and extending upwardly into elongate slot 28 formed in the bottom of the plunger. There are other ways of holding the plunger and base together. In FIG. 2, the buffer is shown in the fully extended position with plug 26 engaging the end of the slot adjacent the rail car. A drainage opening 30 may be provided at the bottom of base 18. The capsule body may be of conventional design conforming to UIC standards.

Buffer spring assembly 34 is confined within cylindrical interior chamber 32 of the capsule body and extends between and engages base plate 36 and head 22. FIG. 3 illustrates the buffer spring assembly 34 as confined in the fully extended capsule body with the body removed. The spring assembly includes an annular elastomer spring 40 and a gas charged piston-type hydraulic spring 42. Springs 40 and 42 are arranged in parallel so that a load exerted on the buffer collapses both springs together.

Figure 5:
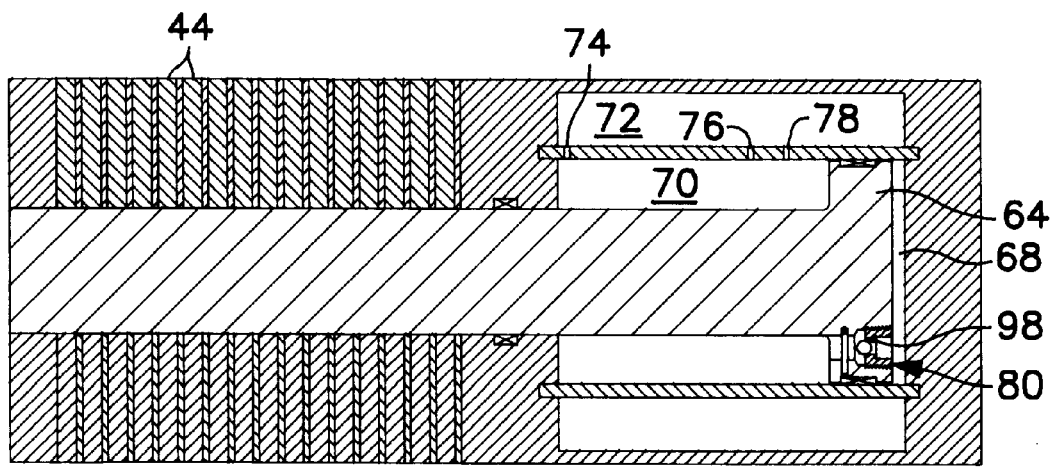

The elastomer spring 40 includes a stack of resilient elastomer ring pads 44 separated by ring-shaped flat metal mounting plates 46. The exterior edges of plates 46 have a loose fit on the interior wall of chamber 32 and the interior edges of the plates have a loose fit on piston rod 48 of gas charged hydraulic spring 42. The elastomer pads 44 are preferably formed from styrene-butadiene elastomer of the type marketed under the trademark KEYGARD by Keystone Industries, Inc., assignee of the present application. The elastomer spring 40 is confined between piston rod stop member or end plate 50 and cylindrical piston housing 52 of spring 42. As shown in FIG. 5, full collapse of the spring 40 compresses and expands the elastomer pads to nearly fill the space between the piston rod and plunger. The elastomer spring is lightly preloaded when the buffer is extended.

Referring now to FIG. 3, piston housing 52 includes a rear head 54 adjacent the elastomer spring, front head 56, and outer and inner cylindrical walls 58, 60 extending between the heads. Piston rod 48 extends into the interior of housing 52 through bore or rod passage 62 in rear head 54. A suitable seal is provided in the bore to prevent leakage of hydraulic fluid from the housing. Piston 64 is provided on the end of piston rod 48 in housing 52 and engages the interior surface of inner wall 60. A suitable seal is provided between the piston and the wall to prevent leakage of hydraulic fluid past the piston. Piston 64 divides the space within wall 60 into front cylindrical chamber 68 in front of the piston and rear cylindrical chamber 70 behind the piston 64. The two walls 58 and 60 define an annular storage chamber 72 surrounding the piston and chambers 68 and 70.

FIG. 3 illustrates the position of the buffer spring assembly 34 when the corner buffer 14 is fully extended. Plug 26 engages the inner end of slot 28 and forms a stop preventing further extension of the buffers. In this position, piston 64 is spaced a short distance from rear head 54, the volume of rear chamber 70 is at a minimum and the volume of the front chamber 68 is at a maximum. One or more return fluid flow apertures 74 are formed through wall 60 adjacent rear head 54 to provide continuous unrestricted fluid flow communication between chambers 70 and 72. A pair of fluid flow apertures 76 and 78 extend through wall 60 and are spaced along the longitudinal axis of the assembly to provide fluid flow communication between chamber 72 and chambers 68 and 70, depending upon the axial position of piston 64. During collapse and expansion of the buffer the piston moves past apertures 76 and 78. Spaced apart apertures 76 and 78 are located about two thirds the way along the collapse stroke of the buffer.

One way ball-type check valve 80 is mounted in the forward face of piston 64, as best illustrated in FIG. 7. Check valve 80 includes a cylindrical body 82 threaded into the forward end of a passage 84 extending through the piston and includes a small diameter central bore 86. Spherical ball 88 has a diameter larger than the diameter of bore 86 and is confined in the rear portion of passage 84 between body 82 and a confinement pin 90 extending across passage 84. The pin is seated in a radial bore 92 formed in the circumference of the piston and extending across passage 84. Bore 92 opens into circumferential recess 94 extending around the piston. The recess receives a sealing member 96 forming a seal between the piston and wall 60. Sealing member 96 may include a sealing ring. Other types of check valves may be used, if desired.

Check valve 80 need not be mounted in the forward face of piston 64. Alternatively, a check valve preventing flow from chamber 70 to chamber 68 when closed may be mounted in the rear face of the piston. Also, the check valve may be mounted in the front head 56 or the portion of inner cylindrical wall 60 immediately adjacent the front head which is not swept over by the seal between the piston 64 and wall 60. In all cases, a check or one way valve permits flow of fluid out from chamber 68 during collapse of the buffer and prevents flow of fluid into chamber 68 during the extension of the buffer. Fluid may flow into either chamber 70 or 72 during extension. The valve may include a bleed orifice 98, as illustrated in valve 80.

Figure 4:
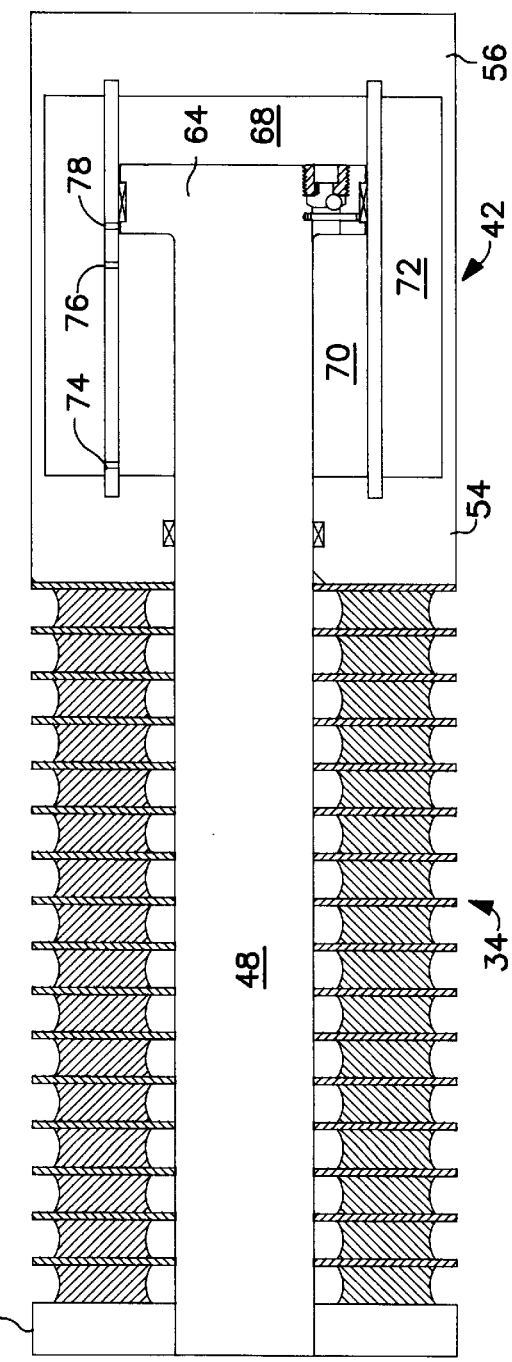

Initial movement of piston 64 away from front head 56 flows a small volume of hydraulic fluid through the check valve and seats ball 88 in bore 86, thereby closing the valve. When the piston is stationary gravity holds the ball away from bore 86, as illustrated in FIG. 3, so that the valve is open. The valve is also open during movement of the piston toward front head 56, as illustrated in FIG. 4.

A small diameter bleed orifice 98 extends through check valve body 82 to one side of bore 86. Bleed orifice 98 is open at all times and provides continuous bleed communication into forward chamber 68. Alternatively, the bleed orifice may be provided through the piston away from the valve. Further, a small diameter bleed orifice 100 may be provided through wall 60 adjacent head 56, as shown in FIG. 8. The bleed orifice 100 is located sufficiently close to head 56 so that it is not closed when piston 64 is fully extended as shown in FIG. 5. A bleed orifice may be provided in head 56 and in communication with chamber 72. Further yet, a bleed orifice may be provided in the piston sealing member 96 to permit continuous bleed communication into chamber 68.

Buffers 14 with a bleed orifice and check valve located in different positions as described perform identically. The following description of the operation of buffer 14 will refer to a bleed orifice located in the check valve and to a check valve in the piston, it being understood that the bleed orifice and valve could be located elsewhere.

The chambers 68, 70 and 72 in spring 42 are charged with hydraulic oil and high pressure nitrogen gas. The gas may have a pressure of 800 pounds per square inch or more when the buffer is extended. Suitable conventional hydraulic oil and gas filling ports (not illustrated) are provided in housing 52. When the gas and hydraulic oil are separated, the oil fills chambers 68 and 70 and partially fills chamber 72. The gas fills the remainder of chamber 72. In practice, collapse of the buffer mixes the gas and oil to form a gas-entrained oil froth.

When the buffer 14 is fully extended as shown in FIG. 2 the buffer spring assembly 34 is positioned as shown in FIG. 3 with piston 64 a short distance inwardly from the rear head 54, resulting in a static preload of about 10 kilo newtons (10 kN). The majority of the preload is provided by the pressurized hydraulic fluid acting on the circular forward face of piston 64, which is larger than the annular reverse face of the piston. The elastomer spring pads are preloaded lightly. Plug 26 confines the preloaded buffer spring against further expansion with end plate 50 seated against head 22 and rear head 56 seated against base plate 36.

Figure 9:
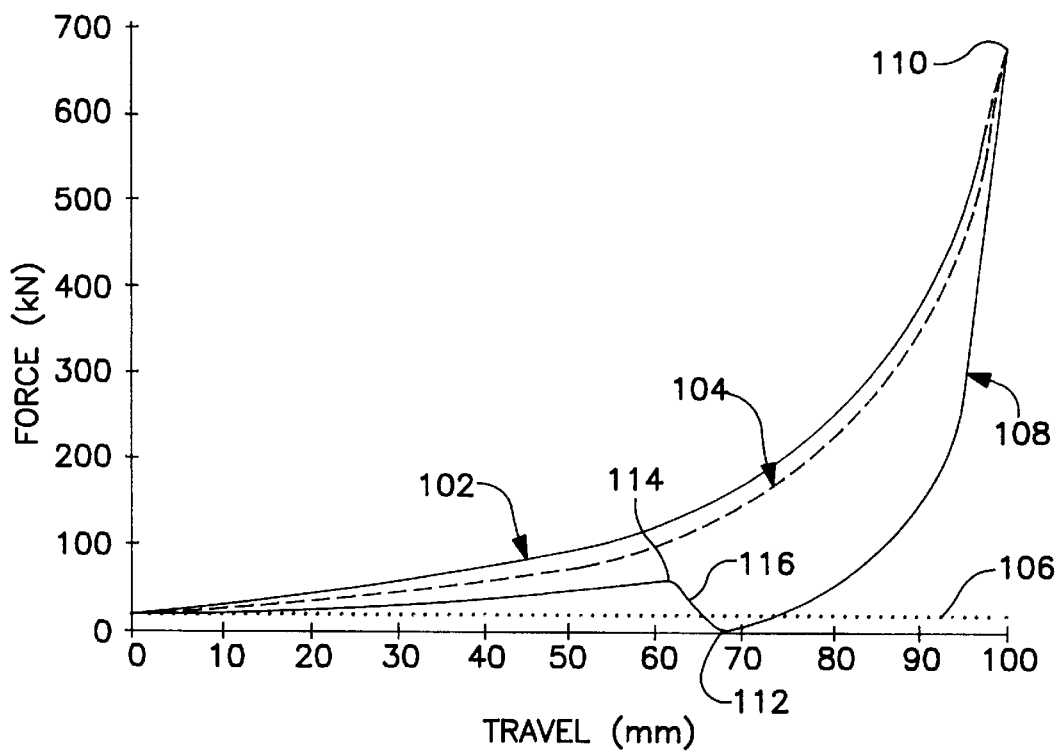
FIGS. 9 and 10 are graphs illustrating performance characteristics of the buffer.

Use of the pressurized gas to provide the required preload for the extended buffer reduces the preload on the elastomer spring and shifts trace 104 of FIG. 9 to the left so that the total compression force when the assembly is collapsed at 100 mm does not exceed the maximum allowed force of 1,000 kN. Without the gas pressure preload, the elastomer spring would have to be compressed more to provide the required 10 kN preload. This additional compression would shift the steep rise portion of trace 104 to the left so that the maximum 1,000 kN force would be exceeded before full collapse of the buffer. The usable or effective stroke of the buffer would be reduced because of early stiffening of the elastomer spring. FIG. 9 is a graph of force vs. distance for static closure and expansion of buffer 14 where the buffer has been collapsed through a 100 mm stroke at a rate of 10 mm per second and then allowed to expand back to the fully extended position at the rate of 10 mm per second. Trace 102 shows the total compression force exerted by the buffer during collapse and is the total of traces 104 and 106. Trace 104 shows the compression force exerted by the elastomer spring 40 during collapse. Trace 106 shows the compression force exerted by hydraulic spring 42 during static collapse. Trace 108 is the total reaction force exerted by the buffer assembly during expansion from the 100 mm collapsed position back to the fully extended position. Slow static collapse of the buffer at 10 mm per second flows hydraulic fluid through the flow apertures 76 and 78 and valve 80 without generating a significant fluid flow compression force.

As illustrated in FIG. 9, static closure of buffer 14 at about 10 mm per second compresses the elastomer spring 40 to generate a compression force trace 104 typical for this type of spring. Upon initial collapse of the elastomer spring, the curve has a shallow positive slope which increases to a near vertical slope at full collapse 110 where the elastomer pads fill the space between plunger 20 and piston rod 48 and the spring becomes stiff. The spring 40 is fully collapsed when plunger 20 engages base 18.

As indicated by trace 106, the compression force due to the gas and hydraulic fluid in hydraulic spring 42 increases slightly during collapse of the buffer. This increase is due to extension of piston rod 48 into chamber 70, thereby decreasing the volume of the three chambers 68, 70 and 72 and increasing the pressure of the gas confined in the chambers, which are in communication with each other.

Figure 6:
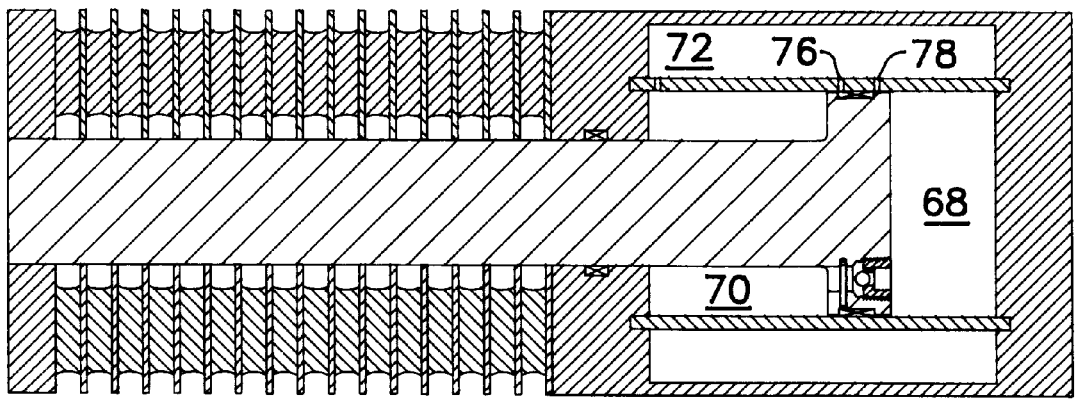

Upon static opening of the collapsed buffer assembly at a controlled rate of 10 mm per second, valve 80 immediately closes preventing flow of hydraulic fluid through bore 86 to reduced volume chamber 68. The elastomer spring 40 exerts a high reaction force biasing the piston back toward the extended position. This force is resisted or snubbed by a pressure differential across piston 64. When the buffer is fully collapsed the volumes of chambers 70 and 72 are reduced to reduce the volume of the compressed gas appreciably and increase gas pressure. The gas pressure may be twice or greater than twice the charging gas pressure. This pressure is exerted on the annular back face of piston 64 and increases during initial return because the gas is further compressed. Upon initial return of the piston valve 80 closes to prevent flow of hydraulic fluid into chamber 68 through the valve and thereby reduces the pressure exerted by the fluid in chamber 68 on the front face of the piston. The pressure may be reduced to as little as about 200 pounds per square inch. The pressure differential across the piston slows or snubbs expansion of the buffer assembly from the fully collapsed position of FIG. 5 to the position of FIG. 6. During this time, there is limited bleed flow of hydraulic fluid into chamber 68 through bleed orifice 98. The restricted flow of hydraulic fluid into chamber 68 allows slow, snubbed expansion of the buffer assembly by elastomer spring 40. Opening of aperture 78 increases the flow of hydraulic fluid from chamber 72 into chamber 68, reduces the pressure differential across the piston and snubbing, increases the reaction force of the buffer and speeds expansion.

Trace 108 indicates the reaction force exerted by the buffer during static opening. The reaction force drops to nearly zero immediately before the piston starts to open aperture 78, as indicated by low point 112 on trace 108. Opening of aperture 78 increases the flow of hydraulic fluid into chamber 68 to reduce the pressure differential and snubbing restraint on expansion of buffer assembly and increase the reaction force of the buffer assembly as indicated by negative slope portion 116 of trace 108. Portion 116 extends from low point 112 to high point 114 where aperture 78 is fully open and flow of hydraulic fluid into chamber 68 is essentially unrestrained. Unrestrained flow of fluid into chamber 68 eliminates the pressure differential across the piston and snubbing. Aperture 78 is typically about 6 times larger than orifice 98. During the remaining extension of the buffer assembly the hydraulic forces resisting expansion and the elastomer spring force expanding the buffer are gradually reduced. Movement of the piston past aperture 76 does not alter the reaction force.

Figure 10:
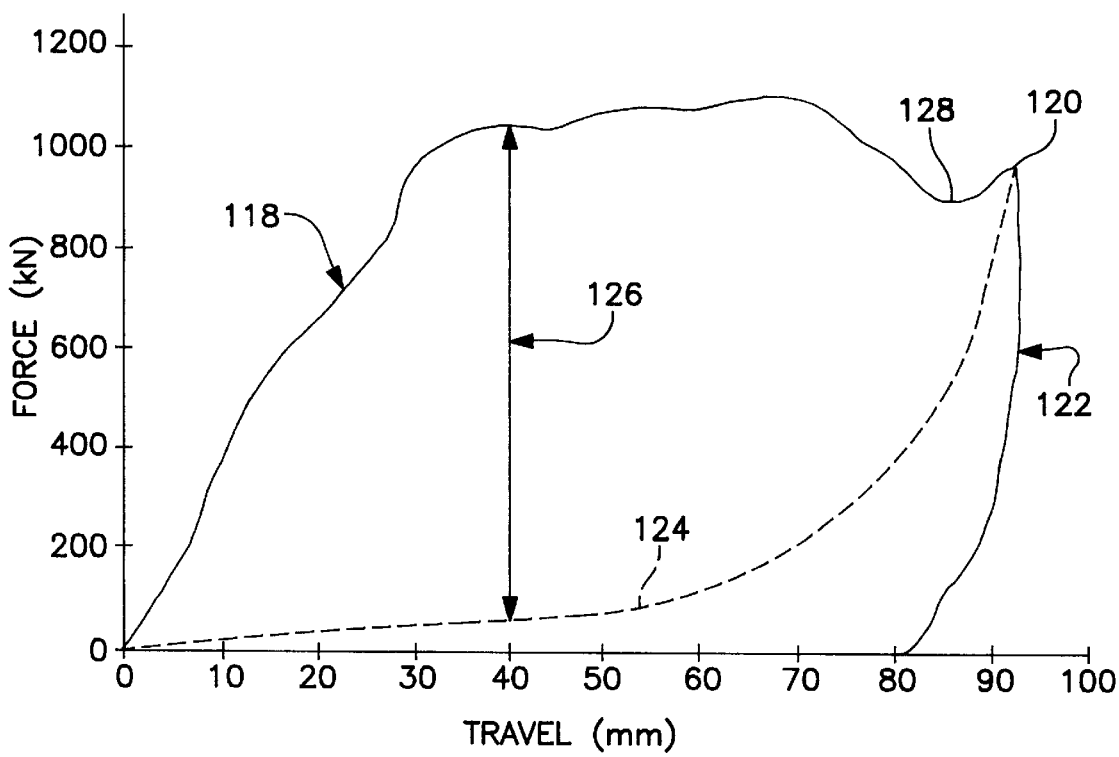

FIG. 10 is a force-travel curve illustrating the compression and reaction forces of buffer 14 during collapse and retraction due to a high speed impact between two rail cars. The graph was generated by using measurements taken from one of two buffers as disclosed mounted on an end of an 80 metric ton rail car which was run against a stationary similar rail car with like buffers at 15.25 kM per hr. The moving car impacted upon the stationary car, following which the stationary car rebounded from the moving car. In FIG. 10, trace 118 extending from the origin to peak 120 indicates the compression force exerted by the buffer during impact. Trace 122 extending from peak 120 down to the x-axis shows the reaction force during expansion of the buffer, prior to separation between the rail cars, which occurred before the buffer expanded fully. Trace 124 shows the total compression force of the elastomer spring 40 and the gas pressure component of the hydraulic spring 42. The hydraulic cushioning force provided by the gas filled hydraulic spring 42 is represented by height 126, the vertical distance between trace 124 and trace 118.

The compression force exerted by the elastomer spring is small during initial collapse and increases very rapidly at the end of the stroke. The hydraulic component of the compression force exerted by the hydraulic spring 42 during dynamic collapse of the buffer is velocity dependent. Immediately after impact the buffer is collapsed rapidly forcing the hydraulic fluid in chamber 68 from the chamber through apertures 76 and 78 and the open check valve 80. Collapse is resisted by the resistance to high speed flow of oil through the apertures and valve and increases the hydraulic compression force to about 900 kN at 30 mm collapse. The high hydraulic compression force and conversion of energy to heat are maintained until the collapse velocity of the buffer slows and the compression force exerted by the hydraulic spring decreases at valley 128 in trace 118. After valley 128, the compression force exerted by the buffer increases to peak 120. The impact illustrated in FIG. 10 collapsed the buffer approximately 90 mm, somewhat less than the maximum collapse.

Buffer 14 absorbs energy when collapsed during static and impact closure and efficiently dissipates absorbed energy. During static closure, the elastomer spring is compressed. During compression of the spring a slight amount of energy is dissipated as heat. During static expansion the energy stored in the elastomer spring exerts a reaction force which is snubbed. Snubbing converts a large portion of the stored energy into heat, thereby reducing the amount of energy returned to the system during static expansion. UIC standards include the requirement that the ratio of energy absorbed by the buffer (Wa) to the total energy input received by the buffer (We), or Wa/We, be greater than a set value. The Wa/We ratio for buffer 14 during static closure and expansion is greater than 0.50, and meets UIC requirements.

During dynamic closure of buffer 14 initial high speed collapse of the buffer generates high compression forces in the hydraulic spring and conversion of impact energy to heat. During the final portion of the collapse stroke the speed of collapse and the compression force for the hydraulic spring are reduced and the compression force for the elastomer spring is increased. Expansion of the buffer following dynamic closure is snubbed, as described previously, to convert a large portion of the energy stored in the elastomer spring to heat. The Wa/We ratio for buffer 14 during dynamic closure and expansion is greater than 0.60 and meets UIC requirements. Snubbing assures slow initial expansion of the buffer after collapse. After aperture 78 is opened, the buffer expands to the extended position fairly rapidly.

If desired, cylinder wall 60 may be provided with a single flow aperture, rather than the disclosed pair of equal area apertures 76 and 78. Aperture 76 is provided to improve cushioning of impacts. In some applications both apertures 76 and 78 may be eliminated, with resultant prolonged snubbing.

The invention described herein is used in rail car buffers. However, the invention is not limited to buffers and may be used in other types of railroad cushioning devices including devices mounted on rail cars and joined to a coupler or draw bar.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A rail car buffer comprising;

A) a capsule body including a tubular base having a plate at one end of the buffer and a tubular plunger having a contact head at the other end of the buffer, said base and plunger being fitted together to define a generally cylindrical interior chamber extending between the plate and head; and
    B) a spring assembly in the interior chamber, said assembly including,
        1) a gas filled hydraulic spring, said hydraulic spring having a housing at one end of the interior chamber with opposed front and rear heads and a cylindrical wall extending between the heads, a piston in the cylindrical wall engaging the interior surface of the cylindrical wall, a piston rod joined to the piston and extending outwardly of the housing away from said one end of the interior chamber through a rod passage in the rear head, an end member on the end of the piston rod adjacent the other end of the interior chamber; a front chamber in the housing between the piston and the front head; a rear chamber in the housing between the piston and the rear head; an outer wall surrounding said cylindrical wall and extending between the heads; a storage chamber between said outer and cylindrical walls; hydraulic fluid comprising oil and pressurized gas in said chambers, a fluid flow aperture communicating the rear chamber and the storage chamber, a one way valve communicating the front chamber with another chamber, said valve permitting flow of hydraulic fluid out from the front chamber and preventing flow of hydraulic fluid into the front chamber; and a bleed orifice communicating the front chamber and another chamber permitting bleed flow of hydraulic fluid into the front chamber; and
        2) an elastomer spring confined between the housing and the end member.

2. A rail car buffer as in claim 1 wherein the capsule body includes a stop preventing expansion of the plunger and base, said spring assembly being preloaded to a force of about 10 kN.

3. A rail car buffer as in claim 1 wherein said bleed orifice extends through the cylindrical wall adjacent the front head.

4. A rail car buffer as in claim 1 wherein the valve is located in said piston and includes a valve member engageable to close a passage smaller than the valve member, and said bleed passage extends through the valve body.

5. A rail car buffer as in claim 4 wherein the valve member is spherical and including a pin confining said spherical valve member adjacent the passage.

6. A rail car buffer as in claim 1 wherein the bleed orifice communicates the front chamber and the storage chamber.

7. A rail car buffer as in claim 1 including a first aperture extending through the cylindrical wall away from the front head.

8. A rail car buffer as in claim 7 wherein no fluid flow apertures open into the front chamber forward of the first aperture.

9. A rail car buffer as in claim 7 wherein no fluid flow apertures extend through the cylindrical wall between the first aperture and the front head.

10. A rail car buffer as in claim 9 wherein no fluid flow apertures open into the front chamber through the front head, and the valve and bleed orifice are located in the piston.

11. A rail car buffer as in claim 1 wherein said elastomer spring surrounds the piston rod and includes a plurality of elastomer ring pads separated by ring-shaped plates.

12. A rail car buffer as in claim 11 wherein both springs are cylindrical and have essentially the same diameter.

13. A rail car buffer as in claim 11 wherein when the buffer is extended, the piston is spaced a distance from the rear wall and the gas filled hydraulic spring has a preload of at least 10 kN.

14. A rail car buffer as in claim 1 having a preload of about 10 kN, a Wa/We ratio during static closure and expansion greater than about 0.50 and a Wa/We ratio during dynamic closure and expansion greater than about 0.60.

15. A rail car buffer comprising:
A) a capsule body including a tubular base having a plate at one end of the buffer and a tubular plunger having a contact head at the other end of the buffer, said base and plunger being fitted together to define a generally cylindrical interior chamber extending between the plate and head; and
B) a spring assembly in the interior chamber, said assembly including,
1) a gas filled hydraulic spring, said hydraulic spring having a housing at one end of the interior chamber with opposed front and rear heads and a cylindrical wall extending between the heads, a piston in the cylindrical wall engaging the interior surface of the cylindrical wall, a piston rod joined to the piston and extending outwardly of the housing away from said one end of the interior chamber through a rod passage in the rear head, an end member on the end of the piston rod adjacent the other end of the interior chamber; a front chamber in the housing between the piston and the front head; a rear chamber in the housing between the piston and the rear head; an outer wall surrounding said cylindrical wall and extending between the heads; a storage chamber between said outer and cylindrical walls; hydraulic fluid comprising oil and pressurized gas in said chambers, a fluid flow aperture communicating the rear chamber and the storage chamber, a one way valve extending through the piston communicating the front chamber with the rear chamber, said valve permitting flow of hydraulic fluid out of the front chamber and preventing flow of hydraulic fluid into the front chamber; and a bleed orifice extending through the piston and communicating the front chamber and the rear chamber permitting bleed flow of hydraulic fluid into the front chamber; and
2) an elastomer spring confined between the housing and the end member.

16. A rail car buffer comprising:
A) a capsule body including a tubular base having a plate at one end of the buffer and a tubular plunger having a contact head at the other end of the buffer, said base and plunger being fitted together to define a generally cylindrical interior chamber extending between the plate and head; and
B) a spring assembly in the interior chamber, said assembly including.
1) a gas filled hydraulic spring, said hydraulic spring having a housing at one end of the interior chamber with opposed front and rear heads and a cylindrical wall extending between the heads, a piston in the cylindrical wall engaging the interior surface of the cylindrical wall, a piston rod joined to the piston and extending outwardly of the housing away from said one end of the interior chamber through a rod passage in the rear head, an end member on the end of the piston rod adjacent the other end of the interior chamber; a front chamber in the housing between the piston and the front head; a rear chamber in the housing between the piston and the rear head; an outer wall surrounding said cylindrical wall and extending between the heads; a storage chamber between said outer and cylindrical walls; hydraulic fluid comprising oil and pressurized gas in said chambers, a fluid flow aperture communicating the rear chamber and the storage chamber, a one way valve communicating the front chamber with another chamber, said valve permitting flow of hydraulic fluid out from the front chamber and preventing flow of hydraulic fluid into the front chamber; and a bleed orifice located between the piston and the cylindrical wall communicating the front chamber and rear chamber permitting bleed flow of hydraulic fluid into the front chamber; and
2) an elastomer spring confined between the housing and the end member.

17. A rail car buffer comprising:
A) a capsule body including a tubular base having a plate at one end of the buffer and a tubular plunger having a contact head at the other end of the buffer, said base and plunger being fitted together to define a generally cylindrical interior chamber extending between the plate and head; and
B) a spring assembly in the interior chamber, said assembly including,
1) a gas filled hydraulic spring, said hydraulic spring having a housing at one end of the interior chamber with opposed front and rear heads and a cylindrical wall extending between the heads, a piston in the cylindrical wall engaging the interior surface of the cylindrical wall, a piston rod joined to the piston and extending outwardly of the housing away from said one end of the interior chamber through a rod passage in the rear head, an end member on the end of the piston rod adjacent the other end of the interior chamber; a front chamber in the housing between the piston and the front head; a rear chamber in the housing between the piston and the rear head; an outer wall surrounding said cylindrical wall and extending between the heads; a storage chamber between said outer and cylindrical walls; hydraulic fluid comprising oil and pressurized gas in said chambers, a fluid flow aperture communicating the rear chamber and the storage chamber, a one way valve communicating the front chamber with another chamber, said valve permitting flow of hydraulic fluid out from the front chamber and preventing flow of hydraulic fluid into the front chamber; and a bleed orifice communicating the front chamber and the rear chamber permitting bleed flow of hydraulic fluid into the front chamber; and
2) an elastomer spring confined between the housing and the end member.

18. A rail car cushioning device comprising a hydraulic spring having a housing with opposed front and rear heads and a cylindrical wall extending between the heads, a piston in the cylindrical wall, a piston rod joined to the piston and extending outwardly of the housing through a rod passage in the rear head, a front chamber in the housing between the piston and the front head, a rear chamber in the housing between the piston and the rear head, structure defining a storage chamber, a fluid flow aperture communicating the rear chamber and the storage chamber, hydraulic fluid including oil and gas in said chambers, a one way valve communicating the front chamber and another chamber, said valve permitting flow of hydraulic fluid out of the front chamber and preventing flow of hydraulic fluid into the front chamber, and a bleed orifice communicating the front chamber and another chamber.

19. A rail car cushioning device as in claim 15 including pressurized gas in said chambers.

20. A rail car cushioning device as in claim 18 wherein said one way valve is located in the piston and communicates the front chamber and the rear chamber.

21. A rail car cushioning device as in claim 20 wherein said one way valve comprises a check valve.

22. A rail car cushioning device as in claim 18 including an outer wall surrounding the cylindrical wall and extending between the heads, said storage chamber located between said cylindrical and outer walls.

23. A rail car cushioning device as in claim 18 wherein said bleed orifice extends through the cylindrical wall adjacent the front wall and communicates the front chamber and the storage chamber.

24. A rail car cushioning device as in claim 18 wherein said bleed orifice is located adjacent the front head.

25. A rail car cushioning device as in claim 18 including a first aperture extending through the cylindrical wall a distance from the front head.

26. A rail car cushioning device as in claim 25 wherein such aperture opens into the storage chamber.

27. A rail car cushioning device as in claim 26 wherein the storage chamber surrounds the cylindrical wall.

28. A rail car cushioning device as in claim 25 wherein no fluid flow apertures open into the front chamber forward of the first aperture.

29. A rail car cushioning device as in claim 25 wherein no fluid flow apertures extend through the cylindrical wall between the first aperture and the front head.

30. A rail car cushioning device as in claim 29 wherein no fluid flow apertures open into the front chamber through the front head, and the valve and bleed orifice are located in the piston.

31. A rail car cushioning device as in claim 18 including a member on the piston rod outwardly of the housing and a non-hydraulic spring confined between the housing and the member.

32. A rail car cushioning device as in claim 31 wherein said non-hydraulic spring comprises an elastomer spring.

33. A rail car cushioning device as in claim 32 wherein said elastomer spring surrounds the piston rod, and said housing and elastomer spring are cylindrical and have approximately the same diameter.

34. A rail car buffer including a capsule body having a tubular base and a tubular plunger fitted together to define a cylindrical interior chamber and a rail car cushioning device as in claim 33 fitted in said chamber.

35. A rail car buffer as in claim 34 having a preload of about 10 kN, a Wa/We ratio during static closure and expansion greater than about 0.50 and a Wa/We ratio during dynamic closure and expansion greater than about 0.60.

36. A rail car cushioning device comprising a hydraulic spring having a housing with opposed front and rear heads and a cylindrical wall extending between the heads, a piston in the cylindrical wall, a piston rod joined to the piston and extending outwardly of the housing through a rod passage in the rear head, a front chamber in the housing between the piston and the front head, a rear chamber in the housing between the piston and the rear head, structure defining a storage chamber, a fluid flow aperture communicating the rear chamber and the storage chamber, hydraulic fluid including oil and gas in said chambers, a one way valve communicating the front chamber and another chamber, said valve permitting flow of hydraulic fluid out of the front chamber and preventing flow of hydraulic fluid into the front chamber, and a bleed orifice extending through the piston communicating the front chamber and the rear chamber.

37. A rail car cushioning device comprising a hydraulic spring having a housing with opposed front and rear heads and a cylindrical wall extending between the heads, a piston in the cylindrical wall, a piston rod joined to the piston and extending outwardly of the housing through a rod passage in the rear head, a front chamber in the housing between the piston and the front head, a rear chamber in the housing between the piston and the rear head, structure defining a storage chamber, a fluid flow aperture communicating the rear chamber and the storage chamber, hydraulic fluid including oil and gas in said chambers, a one way valve communicating the front chamber and another chamber, said valve permitting flow of hydraulic fluid out of the front chamber and preventing flow of hydraulic fluid into the front chamber, and a bleed orifice extending through a portion of said one way value communicating the front chamber with another chamber.

38. A method of cushioning high energy rail car impacts by collapsing and then expanding a cushioning device of the type having a non-hydraulic spring and a hydraulic spring arranged in parallel to collapse and expand together, the hydraulic spring having a cylinder, a piston with a front face and a rear face in the cylinder and a piston rod joined to the rear face of the piston and extending out of the cylinder, and a chamber in the cylinder in front of the piston, said cushioning device mounted on a rail car and facing away from the rail car for receiving impacts, comprising the steps of:

A) subjecting the cushioning device to an impact directed toward the rail car;

B) collapsing the cushioning device and both springs first rapidly and then slowly to a collapsed position in response to the impact;

C) during collapse of the cushioning device flowing hydraulic fluid through at least one aperture in the hydraulic spring to convert impact energy to heat, and compressing the non-hydraulic spring to store impact energy in the compressed non-hydraulic spring;

D) expanding the cushioning device and both springs; and

E) flowing hydraulic fluid into the chamber through a bleed orifice to snub expansion of the cushioning device and convert impact energy stored in the compressed non-hydraulic spring to heat.

39. The method of claim 38 including the step of:

F) expanding the cushioning unit first slowly and then more rapidly.

40. The method of claim 38 including the step of:

F) during expansion of the cushioning unit reducing the reaction force of the cushioning unit and then increasing the reaction force.

41. The method of claim 38 including the step of:

F) flowing hydraulic fluid into the chamber through a bleed orifice in the cylinder.

42. The method of claim 32 including the step of:

F) during collapse of the cushioning device flowing hydraulic fluid from the chamber through a one way valve and closing the valve during expansion of the cushioning device.

43. The method of claim 42 including the step of:

G) maintaining a pressure differential across the piston when the cushioning unit is fully expanded to provide a preload of at least 10 kN.

44. The method of claim 42 including the step of:
G) absorbing at least 0.60 of the impact energy received by the cushioning unit during dynamic collapse and expansion of the cushioning unit.

45. The method of claim 44 including the step of:
H) absorbing at least 0.50 of the energy received by the cushioning unit during static collapse and expansion of the cushioning unit.

46. The method of claim 38 including the step of:
F) during expansion of the cushioning device maintaining a high pressure on the rear face of the piston and a low pressure on the front face of the piston and flowing hydraulic fluid into the chamber.

47. A method of cushioning high energy rail car impacts by collapsing and then expanding a cushioning device of the type having a non-hydraulic spring and a hydraulic spring arranged in parallel to collapse and expand together, the hydraulic spring having a cylinder, a piston with a front face and a rear face in a cylinder and a piston rod joined to the rear face of the piston and extending out of the cylinder, and a chamber in the cylinder in front of the piston, said cushioning device mounted on a rail car and facing away from the rail car for receiving impacts, comprising the steps of:
A) subjecting the cushioning device to an impact directed toward the rail car;
B) collapsing the cushioning device and both springs first rapidly and then slowly to a collapsed position in response to the impact;
C) during collapse of the cushioning device flowing hydraulic fluid through at least one aperture in the hydraulic spring to convert impact energy to heat, and compressing the non-hydraulic spring to store impact energy in the compressed non-hydraulic spring;
D) expanding the cushioning device and both springs;
E) snubbing expansion of the cushioning device to convert impact energy stored in the compressed non-hydraulic spring to heat; and
F) flowing hydraulic fluid into the chamber through a bleed orifice extending through the piston.

48. A method of cushioning high energy rail car impacts by collapsing and then expanding a cushioning device of the type having a non-hydraulic spring and a hydraulic spring arranged in parallel to collapse and expand together, the hydraulic spring having a cylinder, a piston with a front face and a rear face in a cylinder and a piston rod joined to the rear face of the piston and extending out of the cylinder, and a chamber in the cylinder in front of the piston, said cushioning device mounted on a rail car and facing away from the rail car for receiving impacts, comprising the steps of:
A) subjecting the cushioning device to an impact directed toward the rail car;
B) collapsing the cushioning device and both springs first rapidly and then slowly to a collapsed position in response to the impact;
C) during collapse of the cushioning device flowing hydraulic fluid through at least one aperture in the hydraulic spring to convert impact energy to heat, and compressing the non-hydraulic spring to store impact energy in the compressed non-hydraulic spring;
D) expanding the cushioning device and both springs;
E) snubbing expansion of the cushioning device to convert impact energy stored in the compressed non-hydraulic spring to heat;
F) during collapse of the cushioning device flowing hydraulic fluid from the chamber through a one way valve and then closing the valve during expansion of the cushioning device; and
G) flowing hydraulic fluid into the chamber through a bleed orifice extending through the piston.

49. The method of claim 47 including the step of:
H) flowing hydraulic fluid from the chamber through the piston during collapse of the cushioning unit.

50. A method of cushioning a rail car impact by collapsing and then expanding a cushioning device including a hydraulic cylinder, a piston in the cylinder and a chamber in front of the piston, comprising the steps of:
A) collapsing the cushioning device along a collapse stroke and increasing the compression force of the cushioning device during collapse;
B) expanding the cushioning device along a return stroke and increasing the reaction force of the cushioning device during expansion;
C) during collapse of the cushioning device flowing hydraulic fluid from the chamber through a one way valve; and
D) during expansion of the cushioning device closing the one way valve and flowing hydraulic fluid into the chamber through a small orifice.

* * * * *

UNITED STATES PATENT AND TRADEMARK OFFICE
CERTIFICATE OF CORRECTION

PATENT NO. : 5,908,123
DATED : June 1, 1999
INVENTOR(S) : Russell J. Huggins

It is certified that error appears in the above-identified patent and that said Letters Patent is hereby corrected as shown below:

Cover page, [56] References Cited, Foreign Patent Documents: Lines 1 and 2, change "Brazil" to "Great Britain"; Line 17 following "1234184 10/1996 France ." delete "..... 8/1996 ..... Germany."; Line 25, following "296 06 256 U" insert "8/1996 Germany.".

In the Specification
Column 1, line 35, following "requirements during a" change "large" to --long--.

In the Claims
Claim 49, line 1, change "47" to --48--.

Signed and Sealed this

Twenty-third Day of November, 1999

Attest:

Q. TODD DICKINSON

*Attesting Officer*  *Acting Commissioner of Patents and Trademarks*